US012558992B2

(12) United States Patent
Chon

(10) Patent No.: US 12,558,992 B2
(45) Date of Patent: Feb. 24, 2026

(54) METHOD AND APPARATUS FOR GENERATING ROUTE GUIDANCE FOR ELECTRIC VEHICLE USING BATTERY POWER STATE INFORMATION

(71) Applicants:Hyundai Motor Company, Seoul (KR); Kia Corporation, Seoul (KR)

(72) Inventor: Un Chon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 120 days.

(21) Appl. No.: 18/390,528

(22) Filed: Dec. 20, 2023

(65) Prior Publication Data

US 2024/0377209 A1 Nov. 14, 2024

(30) Foreign Application Priority Data

May 9, 2023 (KR) ........................ 10-2023-0059653

(51) Int. Cl.
B60L 58/13 (2019.01)
B60W 50/14 (2020.01)
(Continued)

(52) U.S. Cl.
CPC .............. B60L 58/13 (2019.02); B60W 50/14 (2013.01); G01C 21/20 (2013.01); G01C 21/3469 (2013.01); G01C 21/3679 (2013.01); G01C 21/3697 (2013.01); B60L 2240/60 (2013.01); B60L 2250/16 (2013.01); (Continued)

(58) Field of Classification Search
None
See application file for complete search history.

(56) References Cited

U.S. PATENT DOCUMENTS 8,838,318 B2 * 9/2014 Segawa .............. G01C 21/3676
701/22
9,170,118 B2 * 10/2015 Kiyama .................. B60L 53/65
(Continued)

FOREIGN PATENT DOCUMENTS

CN 114954423 A * 8/2022 ............ B60W 20/15
CN 116968560 A * 10/2023 ................ B60L 3/12
(Continued)

*Primary Examiner* — Kevin R Steckbauer
(74) *Attorney, Agent, or Firm* — Fox Rothschild LLP

(57) ABSTRACT

A navigation apparatus generates route guidance for an electric vehicle based on information on a battery power state of the electric vehicle. The navigation apparatus includes a driving route generating unit, a battery information acquiring unit, a mileage calculating unit and a driving information setting unit. The driving route generating unit receives destination information and generates a driving route corresponding to the destination information. The battery information acquiring unit obtains information about a minimum remaining amount of a battery of the electric vehicle input by a driver of the electric vehicle. The mileage calculating unit calculates an available driving distance of the electric vehicle based on a current remaining amount of the battery and the minimum remaining amount of the battery. The driving information setting unit sets information related to the driving route based on the available driving distance, and displays the information via a display apparatus.

15 Claims, 9 Drawing Sheets

(51) Int. Cl.
    *G01C 21/20*         (2006.01)
    *G01C 21/34*         (2006.01)
    *G01C 21/36*         (2006.01)

(52) U.S. Cl.
    CPC .... *B60L 2260/52* (2013.01); *B60W 2050/146* (2013.01); *B60W 2510/244* (2013.01)

(56) References Cited

U.S. PATENT DOCUMENTS

| | | | | |
|---|---|---|---|---|
| 9,310,220 | B2 * | 4/2016 | Ishii | G01C 21/3697 |
| 11,002,557 | B2 * | 5/2021 | Pedersen | B60L 58/12 |
| 11,043,043 | B2 * | 6/2021 | Wang | B60L 58/12 |
| 11,417,916 | B2 * | 8/2022 | Duan | B60L 53/126 |
| 11,827,208 | B2 * | 11/2023 | Park | B60W 10/26 |
| 11,953,336 | B2 * | 4/2024 | Song | B60L 58/13 |
| 12,005,929 | B2 * | 6/2024 | Park | B60L 53/665 |
| 12,188,776 | B2 * | 1/2025 | Ropel | G06Q 10/02 |
| 12,197,224 | B2 * | 1/2025 | Park | B60L 58/13 |
| 12,214,695 | B2 * | 2/2025 | Choi | B60L 58/18 |
| 2010/0138093 | A1 * | 6/2010 | Oku | B60L 53/64 |
| | | | | 180/65.265 |
| 2012/0109515 | A1 * | 5/2012 | Uyeki | G01C 21/3469 |
| | | | | 701/423 |
| 2014/0046595 | A1 * | 2/2014 | Segawa | G01C 21/34 |
| | | | | 701/400 |
| 2014/0163877 | A1 * | 6/2014 | Kiyama | G01C 21/3469 |
| | | | | 701/533 |
| 2015/0057916 | A1 * | 2/2015 | Ishii | G01C 21/3697 |
| | | | | 701/123 |
| 2016/0356616 | A1 * | 12/2016 | Woon | B60L 58/12 |
| 2018/0017399 | A1 * | 1/2018 | Rolnik | G01C 21/3469 |
| 2020/0160619 | A1 * | 5/2020 | Wang | G06N 20/00 |
| 2021/0218073 | A1 * | 7/2021 | Duan | B60L 53/66 |
| 2021/0370974 | A1 * | 12/2021 | Park | B60W 60/0021 |
| 2021/0382492 | A1 * | 12/2021 | Park | G08G 1/22 |
| 2022/0203958 | A1 * | 6/2022 | Park | B60K 6/46 |
| 2022/0274618 | A1 * | 9/2022 | Charr | B60K 35/28 |
| 2022/0282981 | A1 * | 9/2022 | Song | G01C 21/3476 |
| 2022/0376313 | A1 * | 11/2022 | Duan | B60L 53/66 |
| 2023/0152109 | A1 * | 5/2023 | Shin | G01C 21/3605 |
| | | | | 701/410 |
| 2023/0226946 | A1 * | 7/2023 | Yang | B60L 58/12 |
| | | | | 701/22 |
| 2023/0373343 | A1 * | 11/2023 | Kwak | B60L 58/18 |
| 2023/0406150 | A1 * | 12/2023 | Choi | B60L 1/00 |
| 2024/0125607 | A1 * | 4/2024 | Sim | B60L 53/62 |
| 2024/0142247 | A1 * | 5/2024 | Ropel | B60L 58/13 |
| 2024/0248147 | A1 * | 7/2024 | Neuman | G01R 31/382 |
| 2024/0377209 | A1 * | 11/2024 | Chon | G01C 21/3697 |

FOREIGN PATENT DOCUMENTS

| | | | | | |
|---|---|---|---|---|---|
| CN | 118107394 | A | * | 5/2024 | B60K 35/00 |
| EP | 2741052 | A1 | * | 6/2014 | B60L 58/12 |
| EP | 2741052 | B1 | * | 5/2017 | B60L 58/12 |
| JP | 2011120346 | A | * | 6/2011 | |
| JP | 2011232241 | A | * | 11/2011 | |
| JP | 2012103141 | A | * | 5/2012 | |
| JP | 5631367 | B2 | * | 11/2014 | G01C 21/3469 |
| JP | 7166732 | B2 | * | 11/2022 | |
| JP | 2024065664 | A | * | 5/2024 | |
| KR | 20130050461 | A | * | 5/2013 | B60L 58/13 |
| KR | 20150012776 | A | * | 2/2015 | B60L 58/12 |
| KR | 20210021217 | A | * | 2/2021 | B60L 58/12 |
| KR | 20220034266 | A | * | 3/2022 | B60W 50/14 |
| KR | 20240162708 | A | * | 11/2024 | G01C 21/20 |

* cited by examiner

Figure 4:
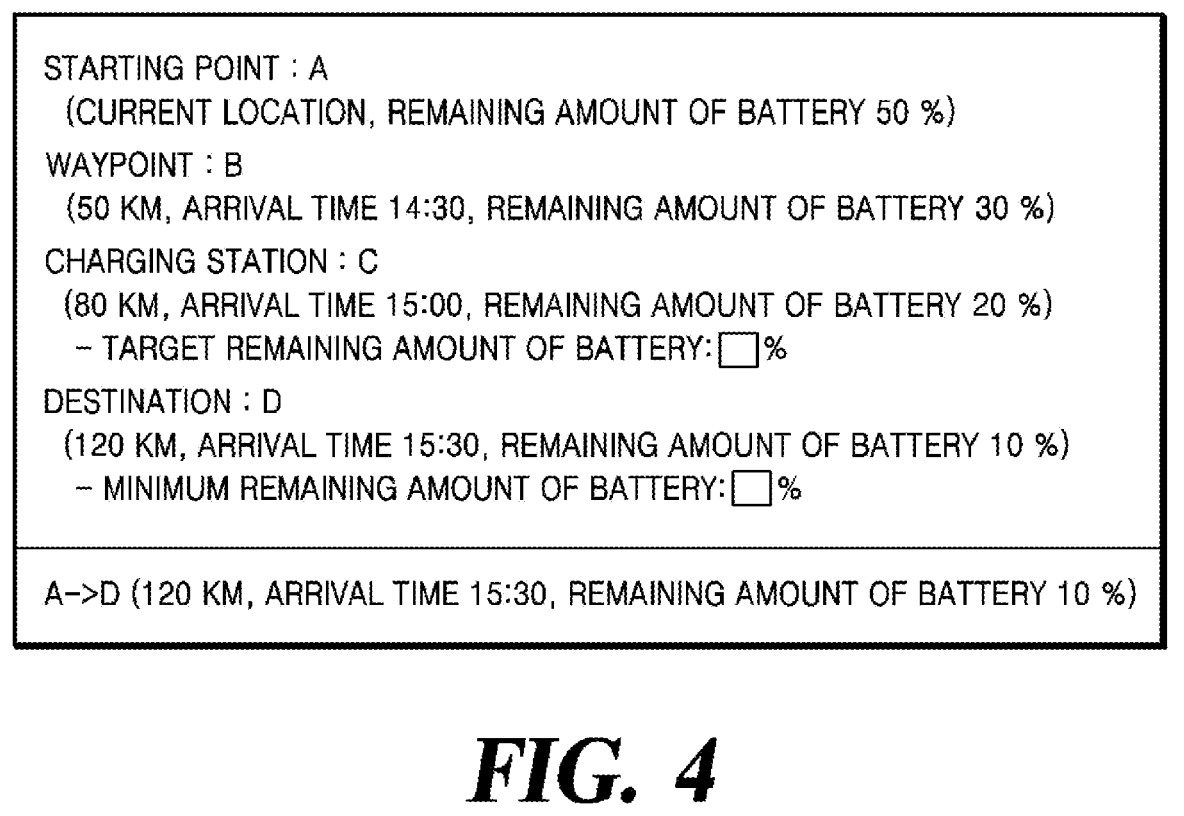

STARTING POINT : A
  (CURRENT LOCATION, REMAINING AMOUNT OF BATTERY 50 %)

WAYPOINT : B
  (50 KM, ARRIVAL TIME 14:30, REMAINING AMOUNT OF BATTERY 30 %)

CHARGING STATION : C
  (80 KM, ARRIVAL TIME 15:00, REMAINING AMOUNT OF BATTERY 20 %)
    – TARGET REMAINING AMOUNT OF BATTERY:☐%

DESTINATION : D
  (120 KM, ARRIVAL TIME 15:30, REMAINING AMOUNT OF BATTERY 10 %)
    – MINIMUM REMAINING AMOUNT OF BATTERY:☐%

A->D (120 KM, ARRIVAL TIME 15:30, REMAINING AMOUNT OF BATTERY 10 %)

METHOD AND APPARATUS FOR GENERATING ROUTE GUIDANCE FOR ELECTRIC VEHICLE USING BATTERY POWER STATE INFORMATION

CROSS-REFERENCE TO RELATED APPLICATION(S)

This application claims under 35 U.S.C. § 119(a) the benefit of Korean Patent Application Number 10-2023-0059653, filed on May 9, 2023, the entire contents of which are incorporated by reference herein.

BACKGROUND

(a) Technical Field

The present disclosure relates to a navigation apparatus for an electric vehicle, more particularly, to a method and apparatus for generating route guidance for the electric vehicle based on information on a battery power state of the electric vehicle.

(b) Description of the Related Art

Since an electric vehicle is not an internal combustion engine vehicle powered by a fossil fuel such as gas, guidance on an eco-friendly route or a fuel efficient route generally provided by a navigation system for a conventional internal combustion vehicle is unnecessary for such an electric vehicle.

Therefore, a navigation apparatus for an electric vehicle needs to provide an option for setting a route suitable for the electric vehicle.

In order to display a remaining amount of a driving battery of an electric vehicle (hereinafter, referred to as "battery"), a conventional navigation system of an electric vehicle displays a maximum driving distance, which is a range that the vehicle can be driven until the remaining amount of the battery becomes 0%, on a dashboard based on a state of charge (SOC; %) or a distance to empty (DTE; km). However, actual users of electric vehicles generally do not fully charge a battery of their vehicle and do not drive the vehicle until the battery is completely discharged.

In particular, users of electric vehicles usually end their trip with a certain remaining amount of charge in a battery at a destination due to a lack of rapid charging stations and a lack of infrastructure for slow charging in their residences.

Regardless of whether a remaining amount of a battery is sufficient or insufficient, drivers traveling to a destination for the first time, or traveling on unfamiliar roads, are faced with various uncertainties related to the battery, such as how many times to charge to the destination, where to charge, how long to wait at a charging station, whether they will be able to drive again with a remaining amount of the battery after arriving at the destination, and whether they will be able to move to a charging station near the destination.

Therefore, in order to prepare for a situation in which a battery cannot be fully charged before reaching the destination, it is necessary to set a minimum remaining amount of the battery at the time of arrival and display a corresponding power-saving driving range as well.

In addition, when a user interface (UI) is added to set a customized driving route with reference to a battery power state of an electric vehicle, range anxiety can be alleviated during long-distance driving.

2

SUMMARY

The present disclosure provides a navigation apparatus operated based on information on a battery power state of an electric vehicle and an operating method thereof.

According to at least one embodiment, the present disclosure provides a navigation apparatus, including a driving route generating unit, a battery information acquiring unit, a mileage calculating unit and a driving information setting unit. The driving route generating unit is configured to receive destination information related to driving of an electric vehicle and generate a driving route corresponding to the destination information. The battery information acquiring unit is configured to obtain information about a minimum remaining amount of a battery of the electric vehicle input by a driver of the electric vehicle. The mileage calculating unit is configured to calculate an available driving distance of the electric vehicle based on a current remaining amount of the battery and the minimum remaining amount of the battery. The driving information setting unit is configured to set information related to the driving route based on the available driving distance.

According to another embodiment, the present disclosure provides a method of navigating, including receiving destination information related to driving of an electric vehicle and generating a driving route corresponding to the destination information, obtaining information about a minimum remaining amount of a battery of the electric vehicle input by a driver of the electric vehicle, calculating an available driving distance of the electric vehicle based on a current remaining amount of the battery and the minimum remaining amount of the battery, and setting information related to the driving route based on the available driving distance.

A vehicle may include the navigation apparatus.

An electric vehicle may include the navigation apparatus.

According to a further embodiment, an electric vehicle may include a navigation apparatus including: a driving route generating unit configured to receive destination information related to driving of the electric vehicle and generate a driving route corresponding to the destination information; a battery information acquiring unit configured to obtain information about a minimum remaining amount of a battery of the electric vehicle input by a driver of the electric vehicle; a mileage calculating unit configured to calculate an available driving distance of the electric vehicle based on a current remaining amount of the battery and the minimum remaining amount of the battery; and a driving information setting unit configured to set information related to the driving route based on the available driving distance; and a display apparatus for displaying driving ranges of the electric vehicle obtained from the driving information setting unit based on the current remaining amount of the battery and the minimum remaining amount of the battery.

According to an embodiment of the present disclosure, it may be possible to provide a driver with convenience in use by providing information on a driving range according to a minimum remaining amount of a battery that can be set.

In addition, it may be possible to alleviate range anxiety of a driver during long-distance driving by adding the UI to set a customized driving route with reference to a battery power state of an electric vehicle.

The effects of the present disclosure are not limited to the aforementioned effects, and other effects not mentioned above will be clearly understood by a person having ordinary skills in the art through the following description.

BRIEF DESCRIPTION OF THE DRAWINGS

FIG. 4 shows a screen for inputting a remaining amount of a battery at a waypoint and a charging station.

DETAILED DESCRIPTION

Figure 1:
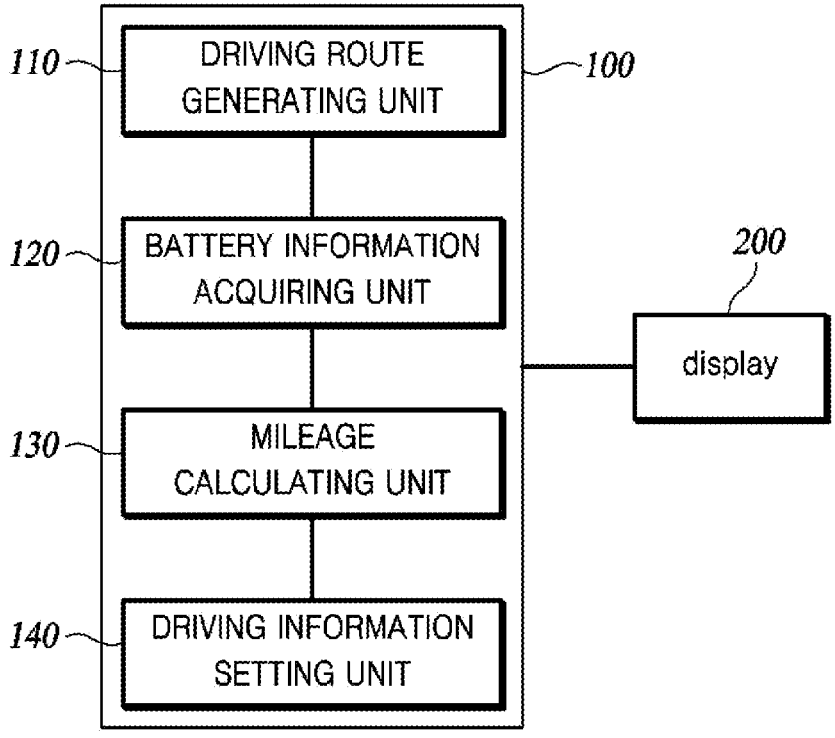
FIG. 1 is an exemplary functional block diagram of a navigation apparatus and a display apparatus according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMS, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Various ordinal numbers or alpha codes such as first, second, i), ii), a), b), etc., are prefixed solely to differentiate one component from the other but not to imply or suggest the substances, order, or sequence of the components.

The description of the present disclosure to be presented below in conjunction with the accompanying drawings is intended to describe exemplary embodiments of the present disclosure and is not intended to represent the only embodiments in which the technical idea of the present disclosure may be practiced.

FIG. 1 is an exemplary functional block diagram of a navigation apparatus 100 and a display apparatus 200 for an electric vehicle according to an embodiment of the present disclosure.

The navigation apparatus 100 according to the embodiment may be designed to include a driving route generating unit 110, a battery information acquiring unit 120, a mileage calculating unit 130, and a driving information setting unit 140.

Each of the above units may constitute modules and/or devices of the navigation apparatus 100, which may be a controller. For example, the above units of the navigation apparatus 100 may constitute hardware components that form part of a controller (e.g., modules or devices of a high-level controller), or may constitute individual controllers each having a processor and memory. The navigation apparatus 100 may include one or more processors and memory.

All the blocks shown in FIG. 1 are not essential components, and some blocks in FIG. 1 may be added, changed, or removed in other embodiments. Meanwhile, the components shown in FIG. 1 are functionally distinct components, and at least one component may be integrated with another component in an actual physical environment.

The navigation apparatus 100 may be mounted on an electric vehicle for navigation and provide navigation information to a driver by referring to a battery power state while the driver is driving the vehicle to a destination.

The display apparatus 200 may be formed as a touch screen outputting an output screen generated by the navigation apparatus 100 and having a touch input function for receiving information input by a driver. For example, the display apparatus 200 may constitute a display for visually displaying information to the driver and/or other occupants of the electric vehicle.

The driving route generating unit 110 may receive destination information related to driving of a vehicle and generate a driving route corresponding to the destination information to visually output the driving route on the screen of the display apparatus 200.

When a user (e.g., a driver) inputs to the display apparatus 200, destination information corresponding to the name of a place or location to which the driver wants to go by driving his or her own vehicle, the driving route generating unit 110 may search for a driving route from the current location to the destination and output the route along with a map to the display apparatus 200.

The battery information acquiring unit 120 may obtain information on a minimum remaining amount of a driving battery of a vehicle (i.e., a minimum remaining amount of charge present in the driving battery) and a current remaining amount of the driving battery (i.e., a current remaining amount of charge available in the driving battery). As used herein, the term "remaining amount" of a driving battery refers to the amount of available charge in the driving battery.

A minimum remaining amount of a battery may include a minimum remaining amount input by a driver and a preset minimum remaining amount. Here, the minimum remaining amount of a battery means a minimum remaining amount of the driving battery that must be maintained until the vehicle arrives at a destination.

The battery information acquiring unit 120 may obtain information about a minimum remaining amount of a battery from information input by a driver of a vehicle.

When a screen through which a driver can input a minimum remaining amount of a driving battery is provided on the display apparatus 200 and the driver inputs the minimum remaining amount of the driving battery into the display apparatus 200, the battery information acquiring unit 120 may store the input minimum remaining amount as the minimum remaining amount input by the driver.

In addition, the battery information acquiring unit 120 may obtain information about a preset minimum remaining amount stored in the navigation apparatus 100.

When information on a minimum remaining amount of a battery is obtained, the mileage calculating unit 130 may calculate a driving distance of the vehicle based on the current remaining amount and the minimum remaining amount of the battery.

A driving distance may include a maximum driving distance and a power-saving driving distance. Here, the maximum driving distance may refer to a driving distance corresponding to a current remaining amount of a battery, and the power-saving driving distance may refer to a driving distance corresponding to a minimum remaining amount of the battery.

A maximum driving distance may be calculated according to Equation 1 below with reference to an energy efficiency of a vehicle.

$$
\begin{aligned}
\text{Maximum driving distance (km)} = \qquad &\text{[Equation 1]} \\
\{\text{current remaining amount of battery} - 0\} & \\
\text{(kW)} \times \text{energy efficiency (km/kW)},
\end{aligned}
$$

In Equation 1, the energy efficiency may be an energy efficiency learned from driving data related to battery consumption of a vehicle may be used.

In addition, the power-saving driving distance may be calculated according to Equation 2 below based on a minimum remaining amount of a battery.

$$
\begin{aligned}
\text{Power-saving driving distance (km)} = \qquad &\text{[Equation 2]} \\
\{\text{current remaining amount of battery} - & \\
\text{minimum remaining amount of battery}\} & \\
\text{(kW)} \times \text{energy efficiency (km/kW)}
\end{aligned}
$$

From Equation 2, as the power-saving driving distance, a first power-saving driving distance based on a preset minimum remaining amount as a minimum remaining amount of a battery and a second power-saving driving distance based on a minimum remaining amount input by a driver as a minimum remaining amount of a battery may be respectively calculated.

Figure 2:
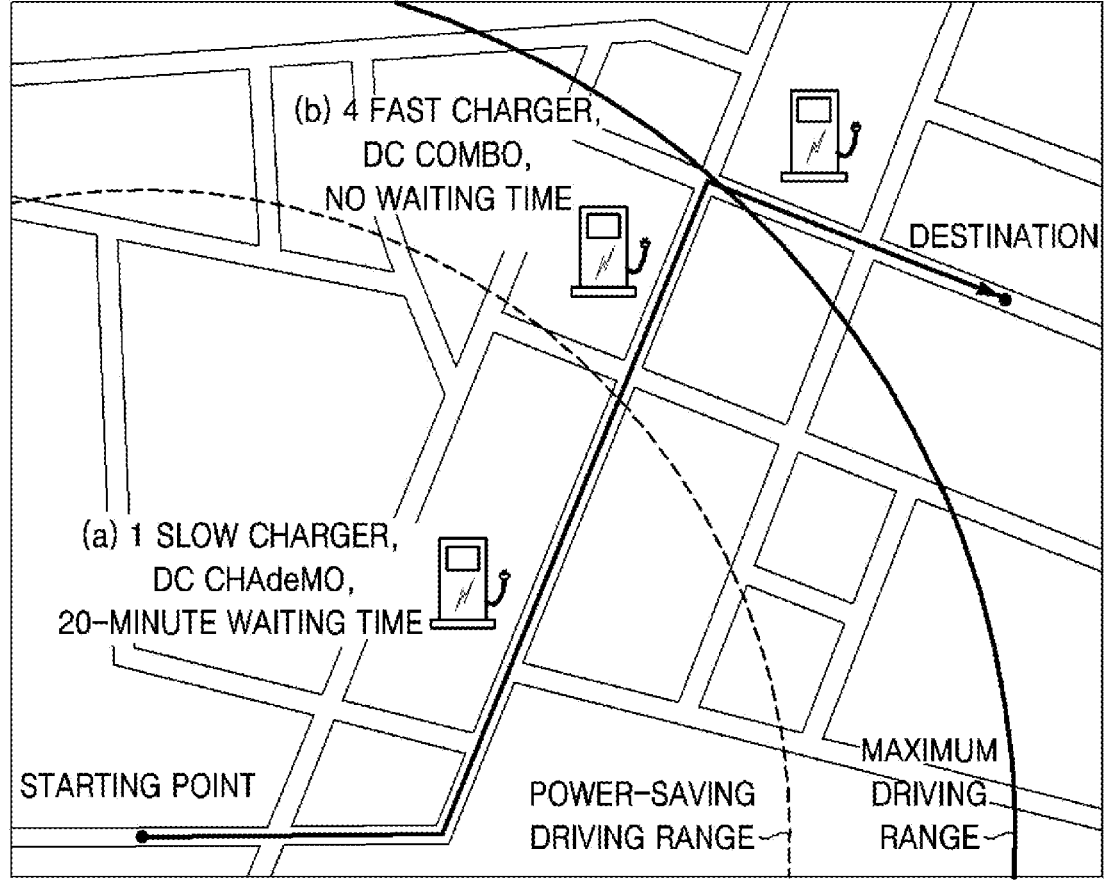
FIG. 2 shows an example of displaying a power-saving driving range and a maximum driving range from a current location, which is the starting point of a vehicle, along with a driving route on a map.

FIG. 2 shows an example of displaying a power-saving driving range and a maximum driving range from a current location, which is the starting point of a vehicle, along with a driving route on a map.

As shown in FIG. 2, the driving route generating unit 110 may show a power-saving driving range in a blue circular shape at a radial position corresponding to a power-saving driving distance, and may show a maximum driving range in a red circular shape at a radial position corresponding to a maximum driving distance.

Depending on particular embodiments of the present disclosure, when the first power-saving driving distance and the second power-saving driving distance are respectively calculated as a power-saving driving distance, power-saving driving ranges corresponding to the first power-saving driving distance and the second power-saving driving distance may be respectively shown.

The driving information setting unit 140 may set driving route-related information based on a driving distance of a vehicle and output some or all of the set information to the display apparatus 200.

Figure 3A:
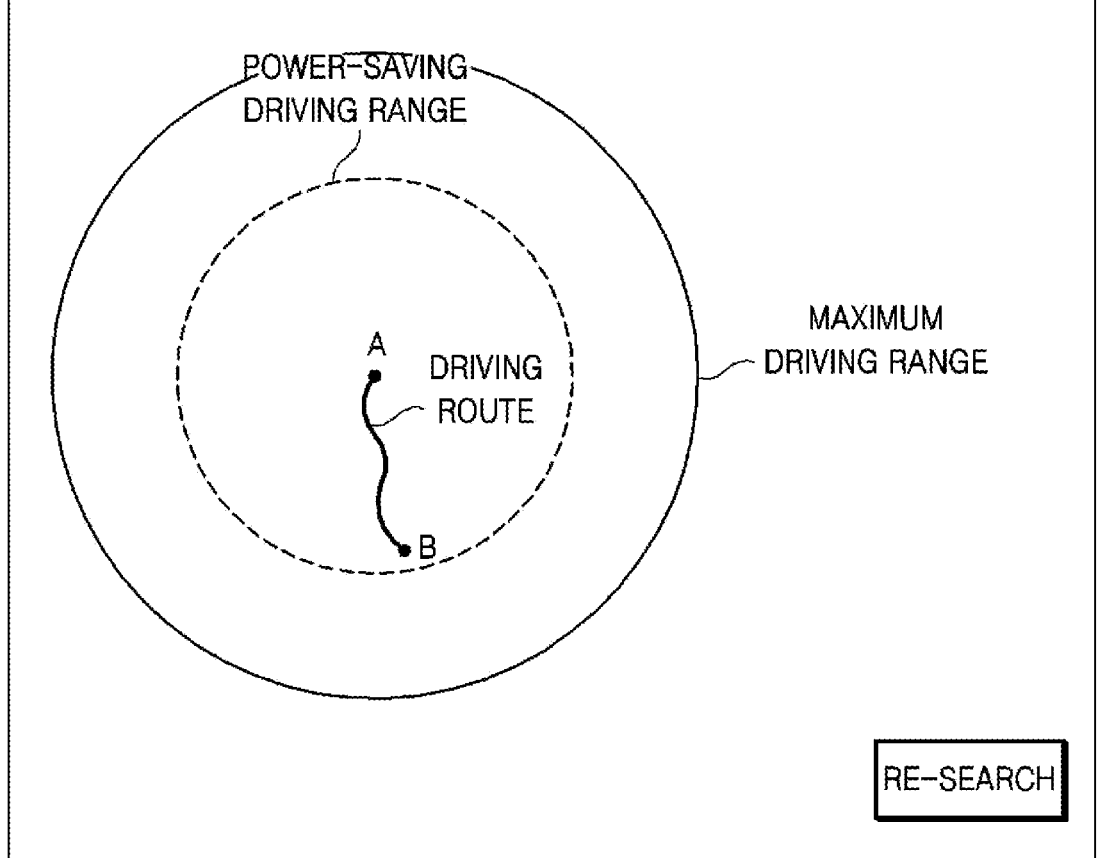
FIGS. 3A to 3C are views of simplified examples of points at which a driving distance is located with respect to a power-saving driving range and a maximum driving range.
Figure 3B:
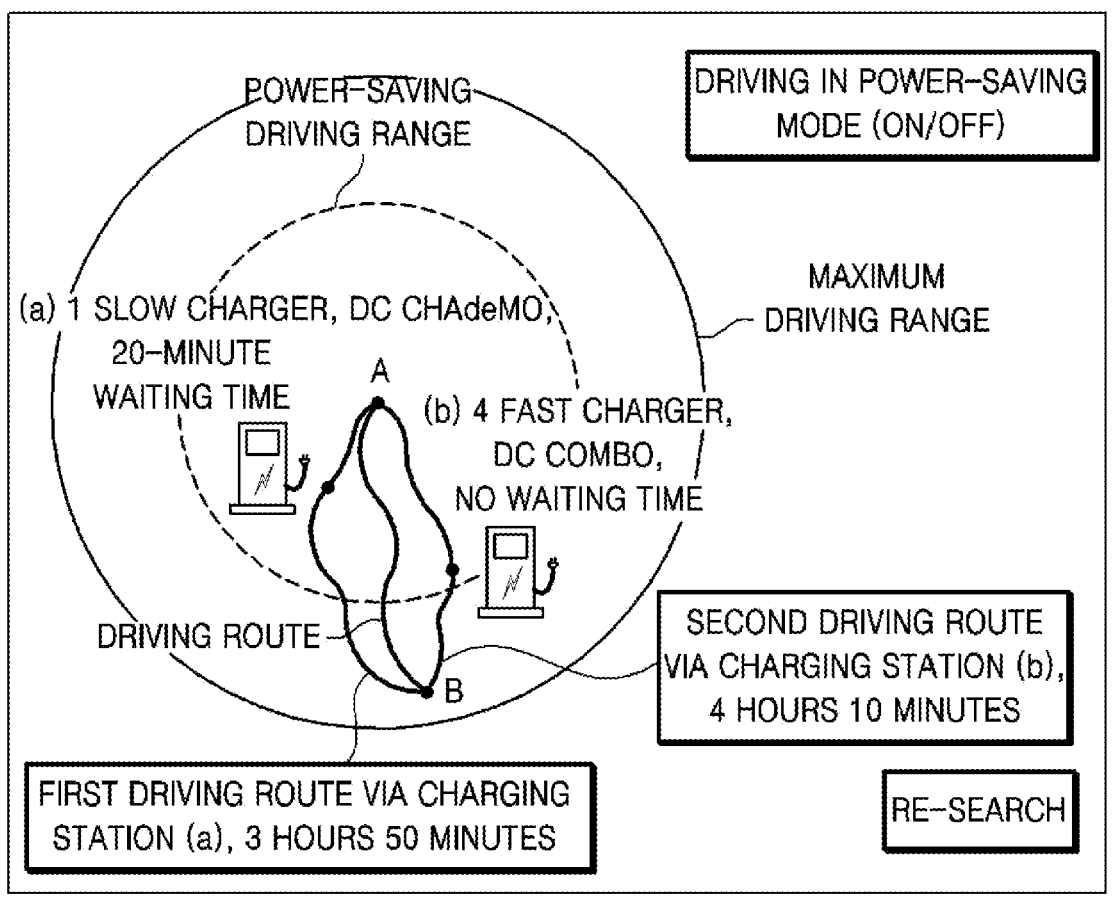
Figure 3C:
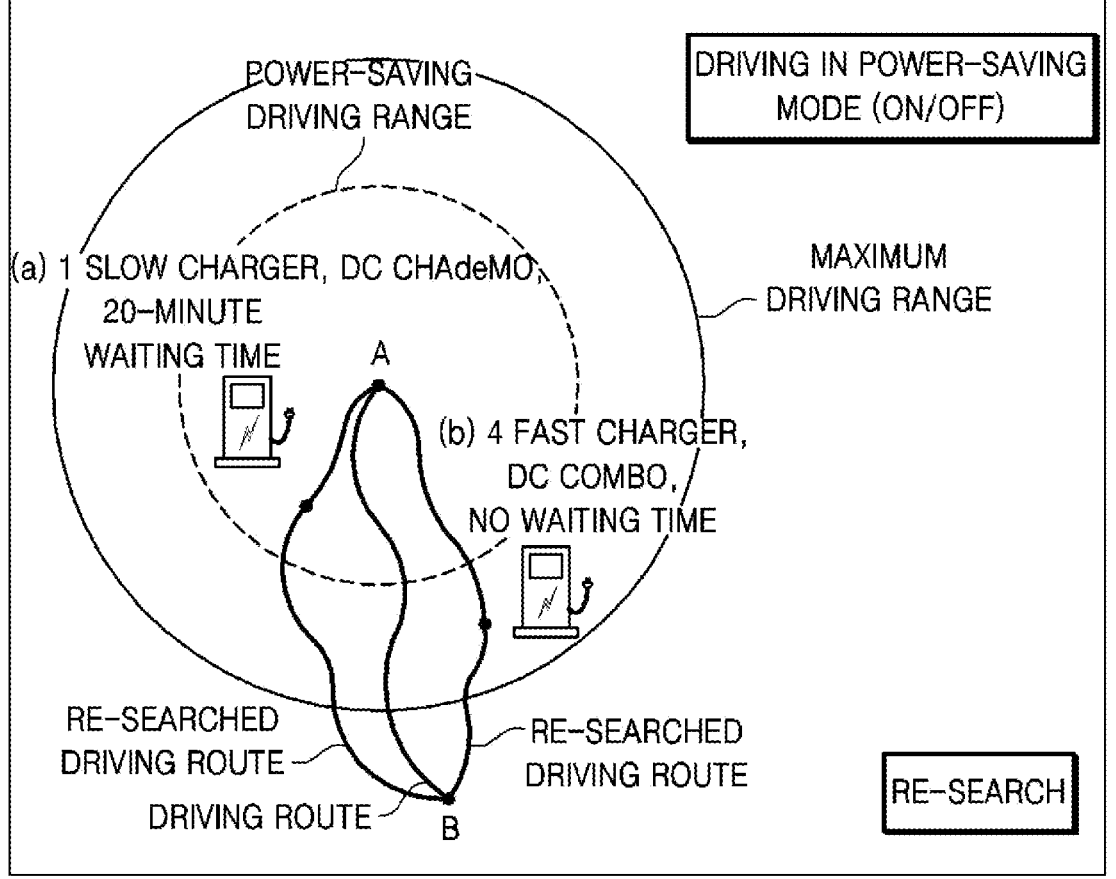

FIGS. 3A to 3C show simplified examples of points where a driving distance is located with respect to a power-saving driving range and a maximum driving range.

In FIGS. 3A to 3C, the power-saving driving range and the maximum driving range are each represented by circles, but, in reality, they may not be displayed as circles but as irregular polygons. Furthermore, as described above, when the first power-saving driving distance and the second power-saving driving distance are respectively calculated as a power-saving driving distance, two power-saving driving ranges corresponding to the first power-saving driving distance and the second power-saving driving distance may be shown.

In addition, in the case of comparing a driving distance of a vehicle and a power-saving driving range in FIGS. 3A to 3C, when the second power-saving driving distance based on a minimum remaining amount input by a driver as a minimum remaining amount is calculated, the second power-saving driving distance as a power-saving driving range may be compared with a driving distance of a vehicle. However, depending on embodiments, the first power-saving driving distance as a power-saving driving range may also be compared with the driving distance of the vehicle.

As shown in FIG. 3A, when a driving distance of a vehicle is within a power-saving driving range (i.e., Case 1), that is, when the vehicle can be driven to a destination while maintaining a minimum remaining amount of a battery, the driving information setting unit 140 may not take any special action since it is possible to smoothly drive the vehicle from the current location A to the destination B.

As shown in FIG. 3B, when a driving distance of a vehicle is between a power-saving driving distance and a maximum driving distance (Case 2), that is, when it is possible to drive the vehicle to a destination while maintaining a remaining amount of a battery smaller than or equal to a minimum remaining amount of the battery, the driving information setting unit 140 may display selection options on the screen of the display apparatus 200 so that at least one of driving in a power-saving mode and charging at a charging station can be selected.

For example, as shown in FIG. 3B, the driving route generating unit 110 may display the location of charging stations close to the driving route and information about the charging stations on the screen. The information about the charging stations may include the location of a corresponding charging station, the number of chargers by standard, waiting time by charger standard, etc. In addition, as shown in the upper right corner of FIG. 3B, the driving route generating unit 110 may display a menu saying "Power-Saving Mode (On/Off)" in relation to driving in a power-saving mode, so that it may be possible to select whether to drive in a power-saving mode. In the meantime, information about waiting time of chargers may be transmitted by a charger management device (not shown) that monitors the status of the chargers.

In this case, the driving information setting unit 140 may output a message window saying "If you'd like guidance on a route via a charging station, please select the location of the next charging station on the map."

When a driver selects "ON" from the "Power-Saving Mode (ON/OFF)" menu on the screen in FIG. 3B, for driving in a power-saving mode, the driving information setting unit 140 may limit operations of a driving system, an external electric load, an air-conditioning controller, a heating wire controller, etc. of the vehicle. Hereinafter, unless otherwise specified, selecting driving in a power-saving mode means that "ON" is selected from the "Power-Saving Mode (ON/OFF)" menu.

For example, in a power-saving mode, the speed of a vehicle may be limited in connection with a driving system (i.e., limitation on a speed of a vehicle), power supply to an external electric load may be limited (i.e., limitation on an external electric load), air conditioning and heating may be limited (i.e., limitation on cooling and heating) in connection with an air conditioning controller, and power supply may be limited in connection with a seat heating wire (i.e., limitation on a heating wire).

The driving information setting unit 140 may automatically select functions available in a power saving mode, such as the limitation on a speed of a vehicle, the limitation on an external electric load, the limitation on cooling and heating, and the limitation on a heating wire. For example, when a power-saving mode is selected by a driver and a current remaining amount of a battery is equal to or greater than a minimum remaining amount of the battery, a basic power-saving command may be executed. Here, the basic power-saving command may involve limiting torque of the vehicle, controlling cooling/heating efficiency while not ruining the feeling of comfort, etc. What corresponds to a basic power-saving command depends on how it is defined and may differ depending on embodiments.

For reference, a power-saving command may include a basic power-saving command and an ultra-power-saving command, and the ultra-power-saving command will be described below.

When there is no charging station near a driving route, the driving information setting unit 140 may provide information on a charging station (i.e., an alternative charging station) relatively far from the driving route. Whether a charging station is located near a driving route may be determined based on whether the charging station is located within a preset distance from the driving route.

Even when an alternative charging station is selected as mentioned above, information for selecting a power-saving mode described above may also be provided. Since how to select a power-saving mode and a basic power-saving command have been described above, a detailed description thereof will not be repeated.

When a destination is between a power-saving driving range and a maximum driving range, for charging the vehicle, the driving information setting unit 140 may display information on charging stations including the location of a charging station located on a driving route or near the driving route, etc.

In this case, the driving information setting unit 140 may receive information on which charging station a driver has selected and provide a driving route via the selected charging station over again when the driver presses the re-search button.

The selection of a charging station will be described with reference to FIG. 3B.

When a driver selects the first charging station (a) at the first position on the display screen and presses the re-search button, the driving information setting unit 140 may re-search and display a driving route including the first charging station (a). In addition, when the driver selects the second charging station (b) at the second position on the display screen and presses the re-search button, the driving information setting unit 140 may re-search and display a driving route including the second charging station (b).

As shown in FIG. 3C, when a driving distance of a vehicle is longer than a maximum driving distance (Case 3), that is, when driving to a destination is impossible with a current remaining amount of a battery, the driving information setting unit 140 may display selection options so that a driver can select charging at a charging station.

In this case, the driving information setting unit 140 may create a pop-up window that says "recharge is required" and output a message window saying "If you'd like guidance on a route via a charging station, please select the location of the next charging station on the map."

When there is no charging station on a driving route, the driving information setting unit 140 may turn on a warning light.

Here, since the selection options for a charging station and the display of a driving route resulting from a re-search of Case 2 also apply to this case, a detailed description thereof will not be repeated.

FIG. 4 shows a screen for inputting a target remaining amount of a battery to be obtained by charging the battery at a waypoint and a charging station.

In the case of Case 2 and Case 3, when the driving information setting unit 140 receives information about a driver's selection of a charging station and recognizes that the driver has pressed a re-search button, it may re-search and display a driving route including the selected charging station as a waypoint. The selection of a charging station may include a selection of a charger specification as well as a selection of a location of a charging station.

When a selection has been made for a charging station, the battery information acquiring unit 120 may receive information about a target remaining amount of a battery to be obtained by charging the battery at each selected charging station from a driver.

In this case, when a driver sets a target remaining amount of a battery to be obtained by charging the battery at each selected charging station and presses a re-search button, the driving information setting unit 140 may display a re-searched driving route. In addition, as shown in FIG. 4, the driving information setting unit 140 may estimate a waiting time for a charger at each charging station and a charging time of the vehicle based on a remaining amount of a battery at the time of arrival at a charging station and a target remaining amount of the battery to be obtained by charging the battery in order to calculate the time required for the vehicle to travel the entire driving route and display it together with a re-searched driving route.

Moreover, a driver may input a minimum remaining amount of a battery at a destination. In this case, when a remaining amount of a battery at a destination for a re-searched driving route is smaller than a minimum remaining amount of the battery at the destination input by the driver, the driving information setting unit 140 may output a message window on the screen so that the driver can reselect a charging station or select driving in a power-saving mode.

When a driver chooses to reselect a charging station, the driving information setting unit 140 may display information about charging stations located on a re-searched driving route or near the re-searched driving route.

The driving information setting unit 140 may store re-searched driving routes for a driver's selection. For example, the driving information setting unit 140 may display a driving route obtained when a driver selects a re-search option for the first charging station (a) (i.e., the first driving route) and a driving route obtained when the driver selects a re-search option for the second charging station (b) (i.e., the second driving route) at the same time, so that the driver can select one of the first driving route and the second driving route.

The driving information setting unit 140 may additionally select a power-saving function depending on a re-searched route based on a selection of a charging station. For example, the driving information setting unit 140 may select the first charging station (a) and calculate a remaining amount of a battery at a destination, and may skip the process of providing information for selecting a power-saving function to a driver when it is determined that the calculated remaining amount of the battery at the destination is equal to or greater than a minimum remaining amount of the battery at the destination. The driving information setting unit 140 may provide the information for selecting a power-saving function to the driver when it is determined that the calculated remaining amount of the battery at the destination is smaller than the minimum remaining amount of the battery at the destination.

Figure 5:
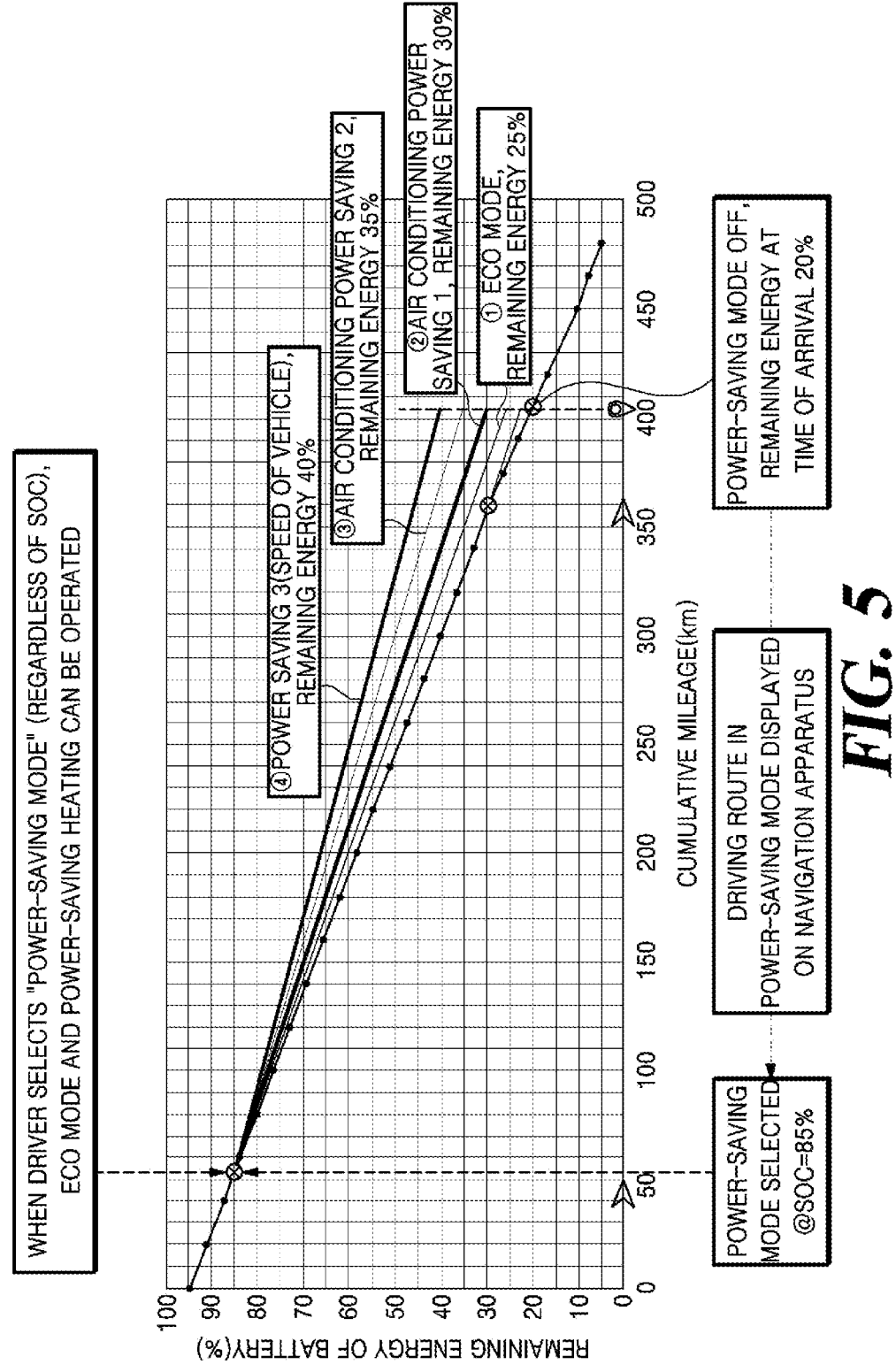
FIG. 5 is a graph showing a remaining amount of a battery for each power-saving method when a power-saving mode is selected.

FIG. 5 is a graph showing a remaining amount of a battery for each power-saving method when a power-saving mode is selected.

As shown in FIG. 5, the driving information setting unit 140 may calculate a power-saving effect for each power-saving method and display a remaining amount of a battery against a driving distance in a graph.

Referring to graphs ① to ④ in FIG. 5, a remaining amount of a battery at a destination for each power-saving method is 20% when a power-saving mode is off, 25% (①) in a normal eco mode, 30% (②) in the case of air conditioning power saving 1, 35% (③)) in the case of air conditioning power saving 2, and 40% (④) in the case of power saving 3 (limitation on a speed of a vehicle).

In FIG. 5, the air conditioning power saving 1 may correspond to controlling cooling and heating efficiency, and the air conditioning power saving 2 may correspond to stopping cooling and heating, but examples of such power-saving methods may vary depending on embodiments.

Figure 6:
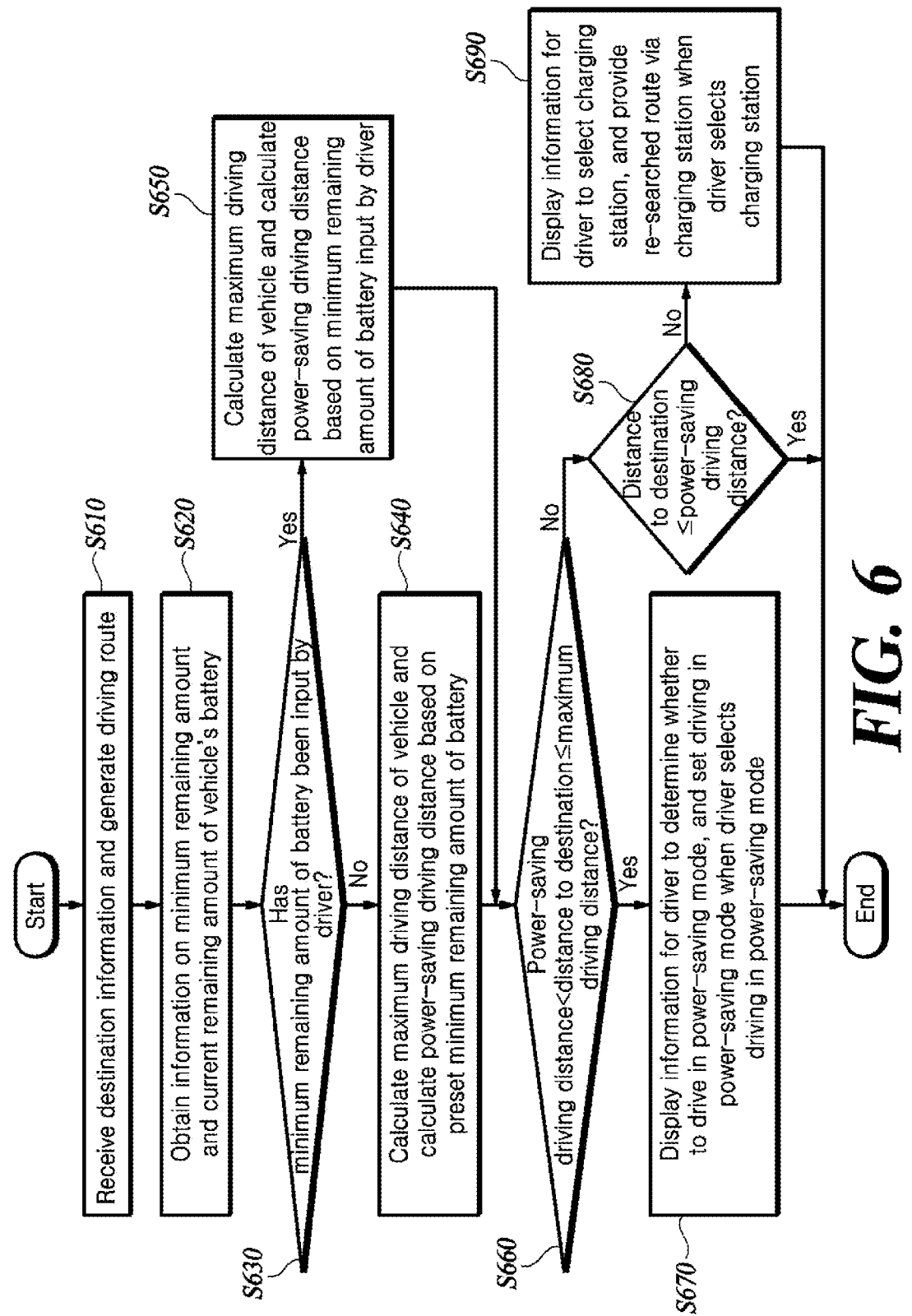
FIG. 6 is a flowchart of how a navigation apparatus 100 navigates according to an embodiment of the present disclosure.

FIG. 6 is a flowchart of how the navigation apparatus 100 navigates according to an embodiment of the present disclosure.

Hereinafter, a method of navigating according to an embodiment of the present disclosure will be described with reference to FIGS. 1 to 6.

The driving route generating unit 110 may receive destination information in connection with driving of the vehicle and create a driving route corresponding to the destination information at S610. Here, the destination information may include the location of the destination.

The driving route generating unit 110 may create a driving route based on the current location of the vehicle, a location of a destination, the road slope between the current location and the destination, indoor/outdoor temperature, etc.

The battery information acquiring unit 120 may obtain information on a minimum remaining amount of a driving battery of the vehicle and a current remaining amount of the driving battery at S620. In this case, the battery information acquiring unit 120 may obtain information on a preset minimum remaining amount of the battery and a minimum remaining amount of the battery input by a driver.

The mileage calculating unit 130 may determine whether a minimum remaining amount of a battery has been input by a driver at S630.

When a minimum remaining amount of a battery has not been input by a driver, the mileage calculating unit 130 may calculate a maximum driving distance of the vehicle according to Equation 1 and calculate the first power-saving driving distance as a power-saving driving distance based on a preset minimum remaining amount of the battery as the minimum remaining amount of the battery according to Equation 2 at S640.

When it is determined that the minimum remaining amount of the battery has been input by the driver at S630, the mileage calculating unit 130 may calculate the maximum driving distance of the vehicle according to Equation 1 and calculate the second power-saving driving distance as a power-saving driving distance based on the minimum remaining amount of the battery input by the driver as the minimum remaining amount of the battery according to Equation 2 at S650.

The driving information setting unit 140 may determine whether a distance to a destination is longer than a power-saving driving distance and shorter than or equal to a maximum driving distance at S660.

When the distance to the destination is longer than the power-saving driving distance and shorter than or equal to the maximum driving distance, the driving information setting unit 140 may display information for the driver to select a charging station near a driving route and information for the driver to determine whether to drive in a power-saving mode, display a re-searched route via the charging station when the driver selects information on the charging station, and set driving in a power-saving mode when the driver selects driving in a power-saving mode at S670. Here, when there is no charging station near the driving route, the driving information setting unit 140 may display information for the driver to select an alternative charging station far from the driving route.

At S670, the driving information setting unit 140 may estimate a waiting time for a charger at a charging station and a charging time of the vehicle based on a remaining amount of a battery at the time of arrival at the charging station and a target remaining amount of the battery to be obtained by charging the battery in order to calculate the time required for the vehicle to travel the entire driving route and display it.

When the distance to the destination is shorter than or equal to the power-saving driving distance or longer than the maximum driving distance, the driving information setting unit 140 may determine whether the distance to the destination is shorter than or equal to the power-saving driving distance at S680. When the distance to the destination is shorter than or equal to the power-saving driving distance, the driving information setting unit 140 may provide an original driving route without taking any special action.

When the distance to the destination is longer than the maximum driving distance at S680, information for the driver to select a charging station is displayed and a re-searched driving route via the selected charging station when the driver selects information on the charging station is provided at S690. At S690 as well, driving in a power-saving mode may be selected by the driver.

Figure 7:
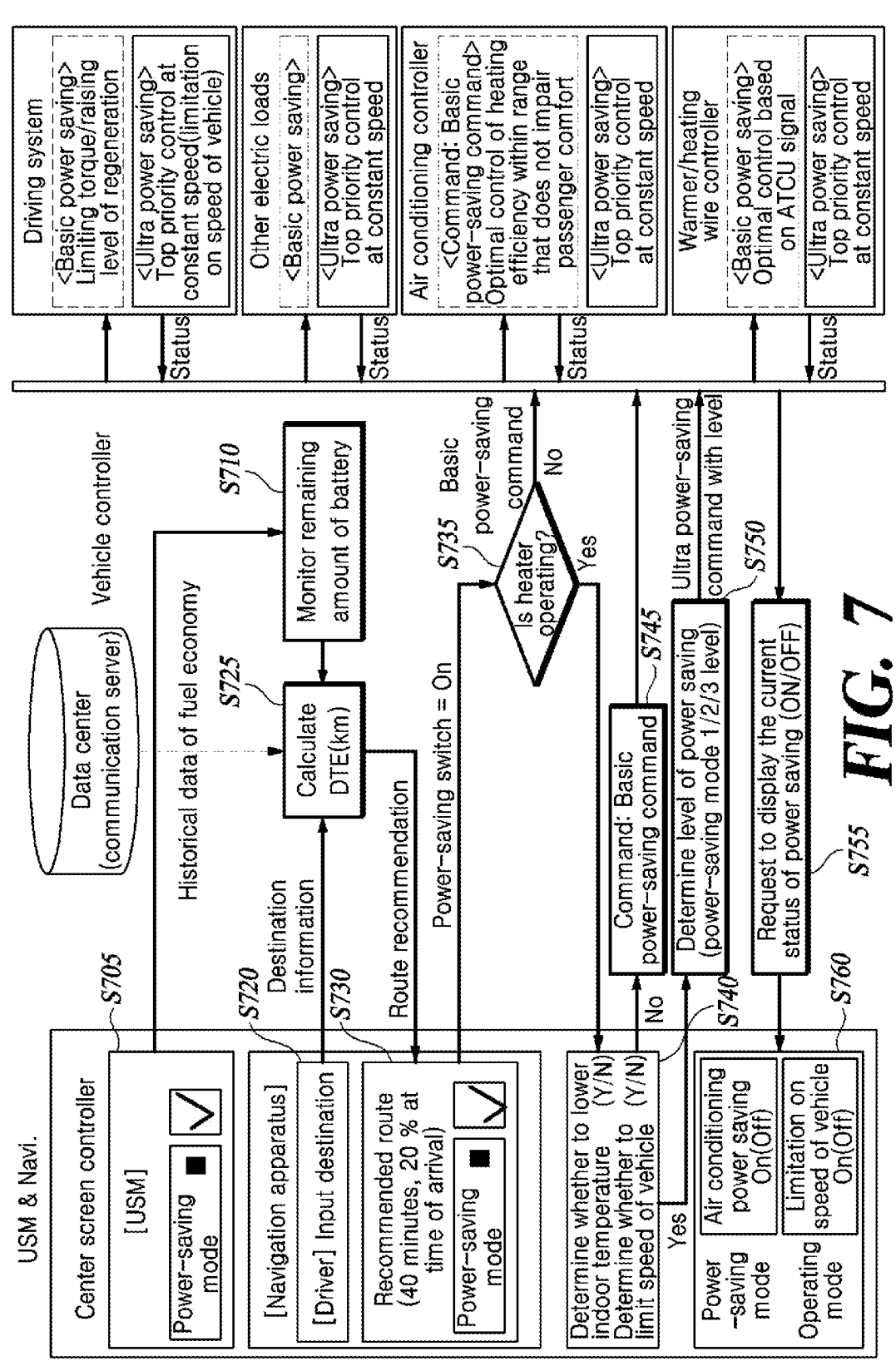
FIG. 7 is a block diagram and a flowchart for describing an example related to selecting driving in a power-saving mode.

FIG. 7 is a block diagram and a flowchart for describing an example related to selecting driving in a power-saving mode.

The driving information setting unit 140 may recognize that a driver has selected driving in a power-saving mode based on a user setting mode (USM) installed in the vehicle at S705. In this case, the vehicle may be controlled to be driven in a power-saving mode as the power-saving mode starts.

When driving in a power-saving mode is selected, the battery information acquiring unit 120 may obtain information on a current remaining amount of a battery at S710.

A driver may input a destination on the navigation apparatus at S720.

The mileage calculating unit 130 may receive information about the destination input by the driver, obtain information about the current remaining amount of the battery and a minimum remaining amount of the battery (e.g., 30%), and calculate the SOC at the destination at S725.

When the SOC at the destination is less than the minimum remaining amount of the battery, the driving information setting unit 140 may display a message window for providing guidance on whether driving in a power-saving mode has been selected on the screen of the navigation apparatus at S730. When the power-saving mode has been selected at S705, it is displayed on the screen of the navigation apparatus that the power-saving mode has been selected.

After the power-saving mode is selected, information for selecting a charging station may be displayed on the screen, but a detailed description thereof will not be provided here since this has been described above.

When the power-saving mode has been selected, the driving information setting unit 140 may determine whether an air-conditioning device (e.g., a heater) is operating at S735.

When a heater is not operating, the driving information setting unit 140 may transmit a basic power-saving command to a related in-vehicle system. Here, the related in-vehicle system may be a driving system, other electric loads, an air-conditioning controller, a heating wire control-ler, etc., and they may receive the basic power-saving command and perform a promised operation corresponding to basic power saving.

When a heater is operating at S735, the driving informa-tion setting unit 140 may display a pop-up window for selecting an ultra-power-saving mode on the display screen at S740.

Here, the driving information setting unit 140 may create a part for asking whether a decrease in an indoor temperature is desired and a part for asking whether limiting the speed of the vehicle is desired on the pop-up window in order to obtain the driver's answer to each of the questions.

When neither the decrease in the indoor temperature nor the limitation on the speed of the vehicle is selected at S740, the driving information setting unit 140 may transmit the basic power-saving command to a related in-vehicle system at S745.

When a driver selects at least one of lowering an indoor temperature and limiting the speed of the vehicle, the driving information setting unit 140 may determine the level of power saving based on the driver's selection at S750. For example, when both a decrease in an indoor temperature and limitation on the speed of the vehicle are selected, the driving information setting unit 140 may transmit an ultra-power-saving command to related in-vehicle systems. The related in-vehicle systems that have received the ultra-power-saving command may respectively perform top pri-ority control at a constant speed. The level of power saving corresponding to the top priority control at a constant speed may be higher than the level of a basic power saving, and specific details thereof may vary depending on embodi-ments.

The driving information setting unit 140 may request that the current power-saving mode be displayed on the display screen at S755, and the current power-saving mode may be displayed on the display screen at S760.

Each component of a device or a method according to the present disclosure may be in the form of hardware or software or in the form of a combination of hardware and software. In addition, a function of each component may be fulfilled in software, and a microprocessor may be formed to perform a function of software corresponding to each com-ponent.

The various embodiments of the systems and techniques described herein may be implemented as digital electronic circuits, integrated circuits, field programmable gate arrays (FPGAs), application specific integrated circuits (ASICs), computer hardware, firmware, software, and/or combina-tions thereof. Such various embodiments may be imple-mented as one or more computer programs executable on a programmable system. The programmable system may include at least one programmable processor (which may be a special purpose processor or a general-purpose processor) coupled to receive data and instructions from and transmit data and instructions to a storage system, at least one input device, and at least one output device. Computer programs (also known as programs, software, software applications, or codes) may contain instructions for a programmable pro-cessor, and may be stored in a non-transitory computer-readable recording medium.

Examples of the computer-readable recording medium may include all types of recording devices in which data that can be read by a computer system is stored. Such computer-readable recording media may be non-volatile or non-transitory media such as ROM, CD-ROM, magnetic tape, floppy disk, memory card, hard disk, magneto-optical disk, and storage device, and may also be a transitory medium such as a data transmission medium. In addition, the com-puter-readable recording media may be distributed in com-puter systems connected through a network, and computer-readable codes may be stored and executed in a distributed manner.

In the flowcharts in the present specification, it is described that each process sequentially occurs, but this is merely an example of the technology of an embodiment of the present disclosure. In other words, a person having ordinary skills in the art to which an embodiment of the present disclosure pertains may make various modifications and variations by changing the orders described in the flowcharts in the present specification or by undergoing one or more of the processes in parallel within the essential characteristics of an embodiment of the present disclosure, so the flowcharts in this specification are not limited to a time-series order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A navigation apparatus for an electric vehicle, the navigation apparatus comprising:

a driving route generating unit configured to receive destination information related to driving of the electric vehicle and generate a driving route corresponding to the destination information;

a battery information acquiring unit configured to obtain information about a minimum remaining amount of a battery of the electric vehicle input by a driver of the electric vehicle;

a mileage calculating unit configured to calculate an available driving distance of the electric vehicle based on a current remaining amount of the battery and the minimum remaining amount of the battery; and a driving information setting unit configured to set information related to the driving route based on the available driving distance, wherein the available driving distance includes a maximum driving distance and a power-saving driving distance, wherein the maximum driving distance is an available driving distance based on the current remaining amount of the battery, wherein the power-saving driving distance is an available driving distance based on the minimum remaining amount of the battery, and wherein the driving information setting unit provides at least one of information for driving in a power-saving mode or information for charging the battery at a charging station, when a distance to the destination is between the power-saving driving distance and the maximum driving distance.

2. The navigation apparatus of claim 1, wherein the driving information setting unit visually outputs driving ranges of the electric vehicle on a display based on the current remaining amount of the battery and the minimum remaining amount of the battery.

3. The navigation apparatus of claim 1, wherein the driving information setting unit provides information for charging the battery at a charging station when the destination is outside the power-saving driving distance.

4. The navigation apparatus of claim 3, wherein the driving route generating unit provides a new driving route via the charging station again when receiving information about a selection of the charging station by the driver.

5. The navigation apparatus of claim 3, wherein the driving information setting unit sets a target remaining amount of the battery at the charging station.

6. The navigation apparatus of claim 3, wherein the driving information setting unit calculates a time required for the electric vehicle to travel the entire driving route by estimating a charging time of the electric vehicle based on a waiting time for a charger at the charging station, a remaining amount of the battery upon arrival at the charging station and the target remaining amount of the battery.

7. The navigation apparatus of claim 3, wherein the driving information setting unit provides a warning to the driver when a distance to the destination exceeds the maximum driving distance and there is no charging station on the driving route.

8. The navigation apparatus of claim 1, wherein the driving information setting unit displays information on how the remaining amount of the battery changes until reaching the destination, when the driving in a power-saving mode has been selected.

9. The navigation apparatus of claim 3, wherein the driving information setting unit provides the driver with information for selecting a power-saving function based on a route re-searched as the charging station is selected.

10. A vehicle comprising the navigation apparatus of claim 1.

11. An electric vehicle comprising the navigation apparatus of claim 1.

12. An electric vehicle, comprising:

a navigation apparatus comprising:

a driving route generating unit configured to receive destination information related to driving of the electric vehicle and generate a driving route corresponding to the destination information;

a battery information acquiring unit configured to obtain information about a minimum remaining amount of a battery of the electric vehicle input by a driver of the electric vehicle;

a mileage calculating unit configured to calculate an available driving distance of the electric vehicle based on a current remaining amount of the battery and the minimum remaining amount of the battery; and a driving information setting unit configured to set information related to the driving route based on the available driving distance; and a display apparatus for displaying driving ranges of the electric vehicle obtained from the driving information setting unit based on the current remaining amount of the battery and the minimum remaining amount of the battery, wherein the available driving distance includes a maximum driving distance and a power-saving driving distance, wherein the maximum driving distance is an available driving distance based on the current remaining amount of the battery, wherein the power-saving driving distance is an available driving distance based on the minimum remaining amount of the battery, and wherein the driving information setting unit provides at least one of information for driving in a power-saving mode or information for charging the battery at a charging station, when a distance to the destination is between the power-saving driving distance and the maximum driving distance.

13. A method of navigating an electric vehicle, the method comprising:

receiving destination information related to driving of the electric vehicle and generating a driving route corresponding to the destination information;

obtaining information about a minimum remaining amount of a battery of the electric vehicle input by a driver of the electric vehicle;

calculating an available driving distance of the electric vehicle based on a current remaining amount of the battery and the minimum remaining amount of the battery; and setting information related to the driving route based on the available driving distance, wherein the available driving distance includes a maximum driving distance and a power-saving driving distance, wherein the maximum driving distance is an available driving distance based on the current remaining amount of the battery, wherein the power-saving driving distance is an available driving distance based on the minimum remaining amount of the battery, and wherein the driving information setting unit provides at least one of information for driving in a power-saving mode or information for charging the battery at a charging station, when a distance to the destination is between the power-saving driving distance and the maximum driving distance.

14. The method of claim 13, wherein the setting comprises visually outputting driving ranges of the electric vehicle based on the current remaining amount of the battery and the minimum remaining amount of the battery.

15. The method of claim 13, wherein the setting comprises providing information for charging the battery at a charging station when the destination is outside the power-saving driving distance.

* * * * *